United States Patent
Vyas et al.

(10) Patent No.: US 8,178,986 B2
(45) Date of Patent: May 15, 2012

(54) WIND TURBINE OPERATION SYSTEM AND METHOD

(75) Inventors: Parag Vyas, Munich (DE); Saskia Gerarda Honhoff, Salzbergen (DE)

(73) Assignee: General Electric Company, Niskayuna, NY (US)

( * ) Notice: Subject to any disclaimer, the term of this patent is extended or adjusted under 35 U.S.C. 154(b) by 494 days.

(21) Appl. No.: 12/406,136

(22) Filed: Mar. 18, 2009

(65) Prior Publication Data

US 2010/0237617 A1 Sep. 23, 2010

(51) Int. Cl.
*F03D 7/00* (2006.01)
*F03D 7/04* (2006.01)
*G06F 19/00* (2011.01)

(52) U.S. Cl. .......................................... 290/44; 702/181

(58) Field of Classification Search ...................... 290/44
See application file for complete search history.

(56) References Cited

U.S. PATENT DOCUMENTS

| | | | |
|---|---|---|---|
| 4,331,881 A | | 5/1982 | Soderholm et al. |
| 4,435,647 A | | 3/1984 | Harner et al. |
| 5,289,041 A | * | 2/1994 | Holley ............................ 290/44 |
| 6,320,272 B1 | | 11/2001 | Lading et al. |
| 6,858,953 B2 | * | 2/2005 | Stahlkopf ....................... 290/44 |
| 6,975,925 B1 | * | 12/2005 | Barnes et al. ................. 700/286 |
| 7,249,486 B2 | | 7/2007 | Wobben |
| 7,308,361 B2 | * | 12/2007 | Enis et al. .......................... 702/2 |
| 7,317,260 B2 | * | 1/2008 | Wilson ............................. 290/44 |
| 7,351,033 B2 | | 4/2008 | McNerney |
| 7,952,215 B2 | * | 5/2011 | Hayashi et al. ................. 290/44 |
| 2003/0160457 A1 | | 8/2003 | Ragwitz et al. |
| 2006/0140764 A1 | | 6/2006 | Smith et al. |
| 2007/0075546 A1 | | 4/2007 | Avagliano et al. |
| 2007/0124025 A1 | * | 5/2007 | Schram et al. ................. 700/287 |
| 2010/0180694 A1 | * | 7/2010 | Ely, III ........................ 73/861.42 |

FOREIGN PATENT DOCUMENTS

| | | |
|---|---|---|
| EP | 1744058 A1 | 1/2007 |
| EP | 1770277 A1 | 4/2007 |
| EP | 1793123 A2 | 6/2007 |
| JP | 11-159436 * | 6/1996 |
| WO | 2007010322 A1 | 1/2007 |

OTHER PUBLICATIONS

Weekley, R. Andrew; Goodrich, R.K.; Praskovsky, A.; "P4.5 An anemometer data quality control method designed for a turbulence and wind shear prediction algorithm"; Comman, L.B. Source: Conference on Aviation, Range, and Aerospace Meteorology, 11th Conference on Aviation, Range, and Aerospace Meterology, 2004, pp. 749-753.

(Continued)

*Primary Examiner* — Burton Mullins
(74) *Attorney, Agent, or Firm* — Ann M. Agosti

(57) ABSTRACT

A method of operating a wind turbine comprises obtaining current wind speed, forecasting wind speeds by creating probability density functions of wind speeds at a series of time points in the future based on the obtained current wind speed and past wind speeds, determining operating parameters of the wind turbine for the forecasted wind speeds, and controlling the wind turbine based on the determined operating parameters.

25 Claims, 3 Drawing Sheets

OTHER PUBLICATIONS

Hooft, E.L. van der; Engelen, T.G. van; "Estimated wind speed feed forward control for wind turbine operation optimization", ECN-RX-04-126; Presented at European Wind Energy Conference 2004; Downloaded from Internet: <http://www.ecn.nl/docs/library/report/2004/rx04126.pdf>; 9 Pages.

A.P. Nawroth and J. Peinke, "Multiscale reconstruction of time series", Physics Letters A 360, 234; Downloaded from Internet<http://arxiv.org/PS_cache/physics/pdf/0608/0608069v1.pdf>; 2006; 5 Pages.

Østergaard, K Z; Brath ,P and Stoustrup, J, "Estimation of effective wind speed", Journal of Physics: Conference Series 75 (2007) 012082, The Science of Making Torque from Wind, Downloaded from Internet<http://www.iop.org/EJ/abstract/1742-6596/75/1/012082/>; 9 Pages.

A.P. Nawroth and J. Peinke, "Multiscale reconstruction of time series", University of Oldenburg, Downloaded from Internet<http://www.physik.uni-oldenburg.de/hydro/unicms%20Hydro/PDF/nawroth.pdf>; 2008; 4 Pages.

European Search Report issued in connection with corresponding Application No. EP10155506 on May 4, 2010.

* cited by examiner

WIND TURBINE OPERATION SYSTEM AND METHOD

BACKGROUND

The subject matter disclosed herein relates generally to methods of operating wind turbines and, more particularly, to a method of operating a wind turbine using forecasted wind speeds.

The output power generated by wind turbines is mainly dependant on the speed of wind incident on wind turbine rotors. Incident wind speed is also a determining factor for loads leading to fatigue and damage of the rotors. Since the wind field varies as a stochastic process, the rotor speed and pitch angles of rotor blades are adjusted by a feedback control to optimize the power output of a wind turbine while maintaining loads within acceptable limits. Wind turbines may also trip or stop power production to prevent excessive loads.

The performance of a wind turbine in terms of maximizing power output and minimizing loads depends on the location of sensors, actuators, and the feedback control algorithm for a controller. Sensors collect data about the incident wind speed either directly or indirectly via turbine measurements. The controller analyzes data collected by the sensors and typically commands the pitch angles of the rotor blades and the rotational speed of the rotor through actuators. In practice, the performance of a wind turbine is limited since the incident wind speed can change rapidly and the turbine can only react to such changes at a slow rate. Both the rotor speed and blade pitch angles can take a finite time to change to new set point values because of the large inertias of wind turbine components and limitations on actuator forces and torques. As a result, the wind turbine encounters higher loads and the energy captured by the wind turbine is suboptimal.

Extreme wind conditions such as sustained gusts can also lead to higher loads and possibly damage or cause shutdown events of the wind turbine. In the case of small temporary gusts, however, shutdown may be unnecessary due to the transient nature of gusts. However, the sensors on wind turbines may not differentiate short gusts from other extreme wind conditions. Shutdown of wind turbines during short gusts thus results in power loss that could have been avoided.

It would therefore be desirable to provide a wind turbine operation method that can anticipate and react to changes in wind conditions in a timely manner to mitigate loads and improve the efficiency of the wind turbine.

BRIEF DESCRIPTION

A method of operating a wind turbine comprises obtaining current wind speed, forecasting wind speeds by creating probability density functions of wind speeds at a series of time points in the future based on the obtained current wind speed and past wind speeds, determining operating parameters of the wind turbine for the forecasted wind speeds, and controlling the wind turbine based on the determined operating parameters.

A system for operating a wind turbine comprises a wind speed estimator for estimating current wind speed, a wind speed forecaster for forecasting wind speeds by creating probability density functions of wind speeds at a series of time points in the future based on the estimated current wind speed and past wind speeds, and a controller for determining operating parameters of the wind turbine for the forecasted wind speeds and providing control commands to the wind turbine based on the determined operating parameters.

A method of operating a wind turbine comprises estimating current wind speed, forecasting wind speeds by creating probability density functions of wind speeds at a series of time points in the future based on the estimated current wind speed and past wind speeds by using statistical properties such as probability density distributions of wind speeds, determining operating parameters of the wind turbine for the forecasted wind speeds, and controlling the wind turbine based on the determined operating parameters. Current wind speed is estimated using sensors on the wind turbine, current operating parameters of the wind turbine, aerodynamic characteristics of the wind turbine, or combinations thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments disclosed herein include wind turbine operation systems and methods. The wind turbine operating system comprises a wind speed estimator for estimating current wind speeds, a wind speed forecaster for forecasting wind speeds based on estimated wind speeds, and a controller for determining operating parameters of the wind turbine for the forecasted wind speeds. The controller provides control commands to the wind turbine based on the determined operating parameters. As used herein, singular forms such as "a," "an," and "the" include plural referents unless the context clearly dictates otherwise.

Figure 1:
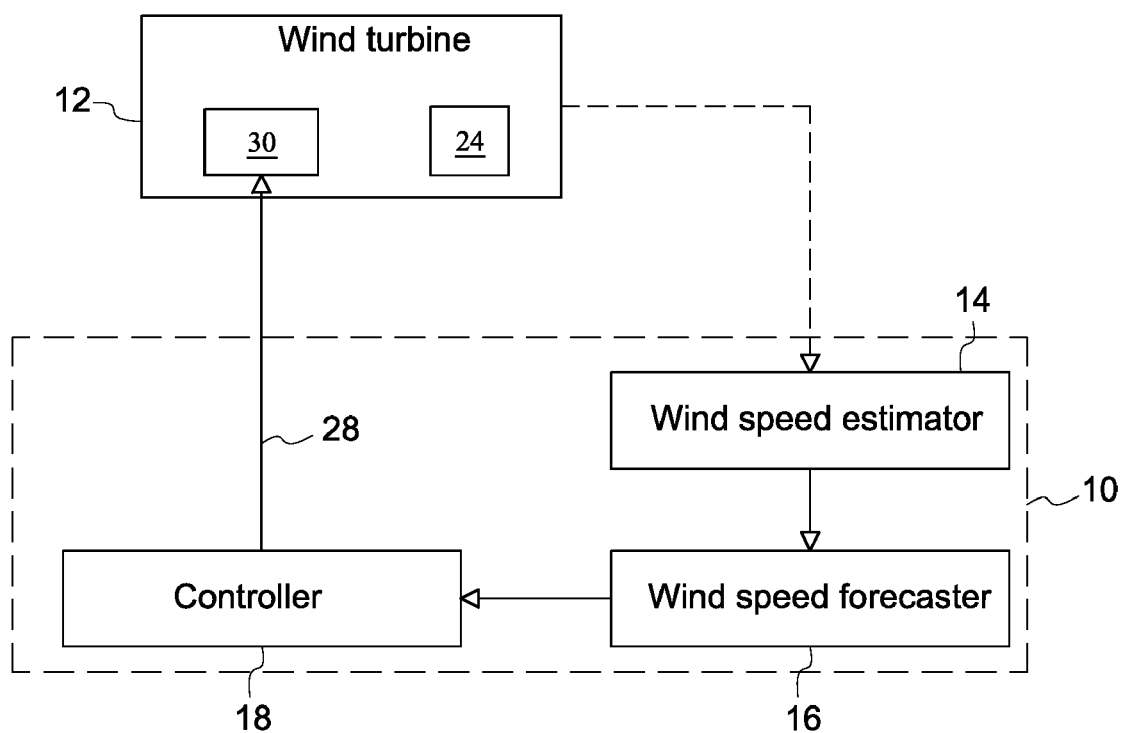
FIG. 1 illustrates a block diagram of an embodiment of the wind turbine operation system in accordance with aspects disclosed herein.
Figure 2:
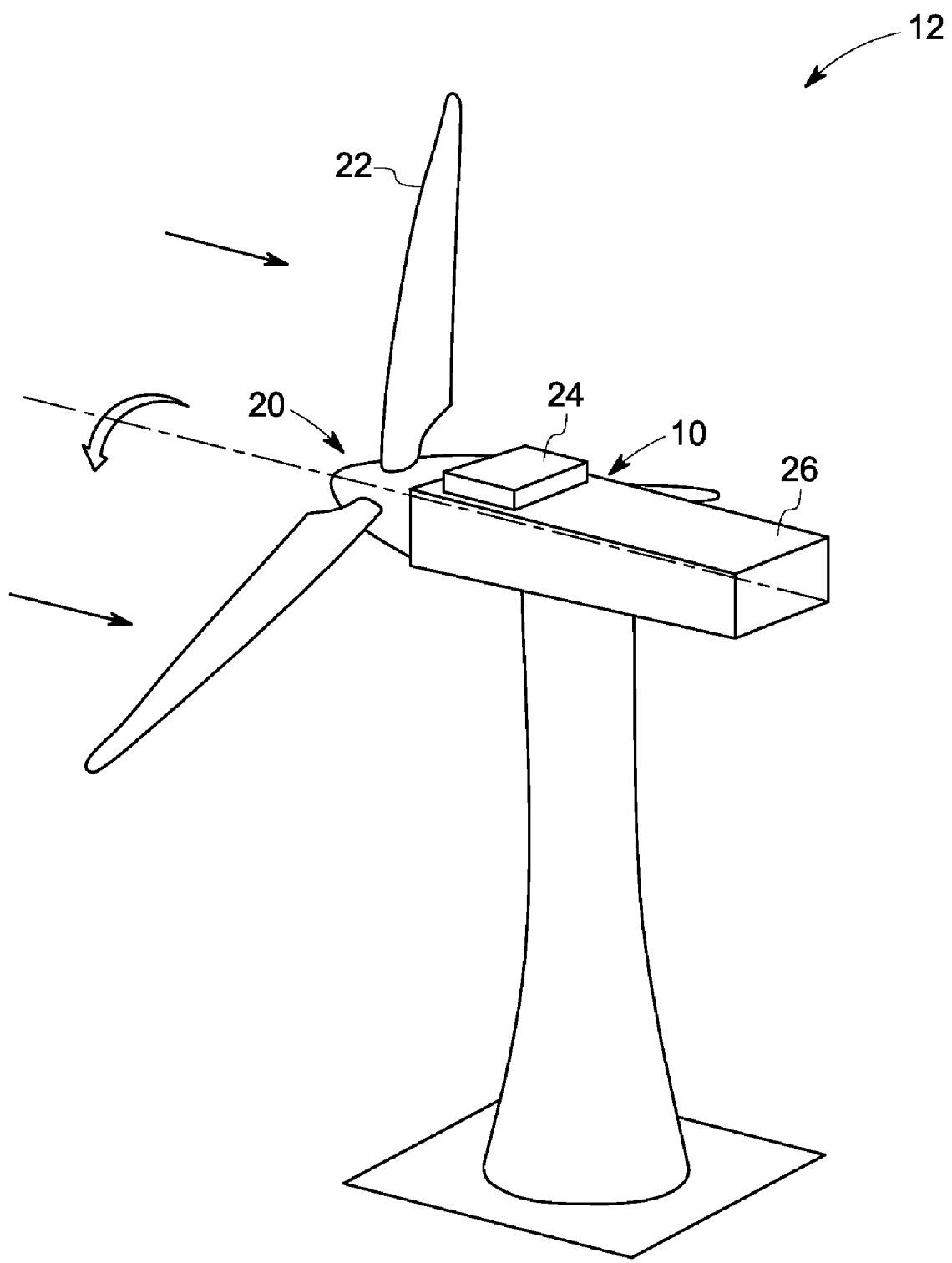
FIG. 2 illustrates a wind turbine integrated with the wind turbine operation system in accordance with aspects disclosed herein.

Referring to FIGS. 1 and 2, a system 10 for operating a wind turbine 12 includes a wind speed estimator 14, a forecaster 16, and a controller 18. The system 10 is associated with a wind turbine 12. The wind speed estimator 14 estimates a current wind speed. In one embodiment, the current wind speed is estimated using current operating parameters of the wind turbine 12 such as rotor 20 speed, pitch angles of rotor blades 22, and power output of the wind turbine. The values of rotor 20 speed, pitch angles of rotor blades 22, and power output of the wind turbine 12 at a given point of time are indicative of a current wind speed incident on the wind turbine 12. Using this approach, the wind speed estimator 14 estimates the current wind speed based on the values of current operating parameters. Additionally, the wind speed estimator 14 can consider the aerodynamic characteristics of the wind turbine 12 for an accurate estimation of the current wind speed.

In another embodiment, wind speeds are obtained from sensors such as anemometers 24 placed anywhere on the wind turbine 12 such as on the nacelle 26. The wind speed estimator 14 accounts for wake effect behind the wind turbine 12 and estimates the current wind speed using data from the anemometer 24.

The forecaster 16 is a wind speed forecaster for forecasting future wind speeds based on the current and past wind speeds estimated by the wind speed estimator 14. Specifically, the wind speed forecaster 16 develops probability density functions of wind speeds at a series of time points in the future based on the current and past wind speeds, as will be explained in detail in reference to FIG. 3. The probability density functions of wind speeds are used to determine when there is a probability beyond a certain threshold of wind speeds, below a certain threshold of wind speeds, around a certain wind speed, or between certain limits of wind speeds that would necessitate adjustment of operating parameters of the wind turbine 12.

The controller 18 determines the operating parameters of the wind turbine 12 based on the forecasted wind speed data. If there is a need to adjust operating parameters, the controller 18 sends control commands 28 to the actuators 30 to adjust the operating parameters of the wind turbine. The operating parameters of the wind turbine can include rotor 20 speed, pitch angles of rotor blades 22, power output of the wind turbine 12, torque of generator of the wind turbine, or any combinations thereof.

The forecasted wind speeds can be used to predict when a future wind speed causes an over speed trip or shutdown of the turbine 12. The controller 18 then sends control commands 28 to adjust blade pitch angles and/or turbine output power to prevent tripping or shutdown of the wind turbine 12. If a future wind speed is too high to avoid over speed of rotor 28, the controller 18 can send control commands 28 to gradually reduce power output of the wind turbine 12 to shutdown the wind turbine. Therefore, the impact of sudden shutdown on mechanical loads on the turbine 12 is reduced and power disturbance on electric utility network can be minimized.

The forecasted wind speeds can also be used to predict lull-type wind conditions. Lull-type wind conditions can be characterized as wind speeds oscillating at or around the cut-in speed of the turbine. Therefore, lull-type wind conditions cause an under-speed trip for the wind turbine 12. The wind turbine 12 restarts again when the wind speed is above the cut-in speed. The use of forecasted wind speeds can avoid unnecessary shutdown and startup cycles that can be referred to as hysteresis loops. If forecasted wind speeds predict a lull-type condition, then the controller 18 sends commands to adjust the wind turbine 12 operating parameters to avoid under-speed tripping.

Other types of hysteresis loops around switching conditions in the wind turbine 12 may also be minimized using the forecasted wind speeds. An example of hysteresis loops around switching conditions is the switching between variable pitch mode and variable rotor speed mode. In wind conditions near a certain point, switching between the two modes can occur relatively frequently leading to large loads on the wind turbine 12. The forecasted wind speeds can be used to determine wind conditions where switching between two modes is absolutely necessary, thereby minimizing the frequency of the switching.

The forecasted wind speeds can also be used to reduce the duty cycle of actuators 30 such as the blade pitch angle drive system (not shown). Forecasted wind speeds that predict minor or insignificant change in wind speed would prevent the pitch angle drive system from being actuated.

In another embodiment (not shown), data from tower top accelerometers or torque and force measurements related to the rotor blades can be provided to the controller. Using this data in addition to forecasted wind speeds, the controller can identify statistical patterns of loads on the blades and predict future loads. This can enable the controller to account for wind speed asymmetries across the rotor blades and adjust operating parameters accordingly.

Figure 3:
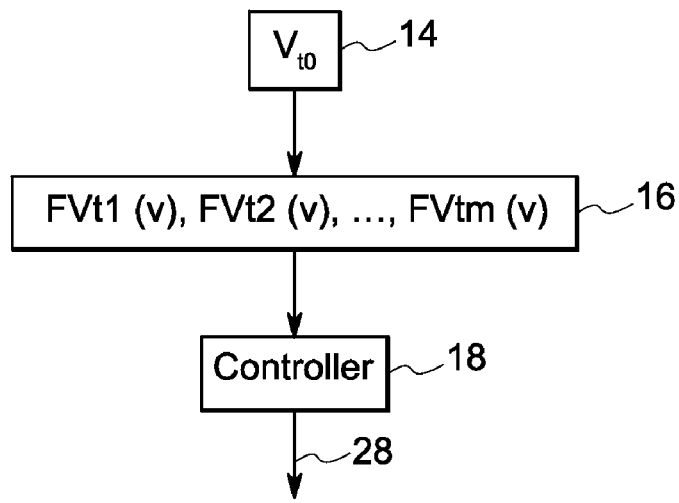
FIG. 3 illustrates an embodiment of wind speed forecasting in accordance with aspects disclosed herein

An exemplary embodiment of forecasting wind speeds is explained in detail by referring to FIG. 3. The wind speed estimator 14 estimates current wind velocity at time $t_0$. Current wind velocity is represented as $V_0$. Past wind velocities obtained by the wind speed estimator 14 can be represented as $V_{-1}, V_{-2}, V_{-3}, \ldots$. For the given current wind velocity ($V_0$) and past wind velocities ($V_{-1}, V_{-2}, V_{-3}, \ldots$), the forecaster 16 develops probability density functions of wind speeds at a series of time points in the future. The probability density functions for future time points $t_1, t_2, t_3, \ldots, t_m$ are represented as $F_{Vt1}(v), F_{Vt2}(v), \ldots, F_{Vtm}(v)$. Each of these probability density functions of wind speeds is used to determine probability distribution of wind speeds.

In one embodiment, measured statistical properties of wind speeds and reconstruction techniques are used to create probability density functions at a series of time points in the future. The forecasts of the wind speeds in the future at the series of time points $t_1, t_2, t_3, \ldots, t_m$ include the random variables (i.e. velocities) $V_{t1}, V_{t2}, \ldots, V_{tm}$. As an example, the probability density functions associated with the random variables can be represented as $F_{Vt1}(v), F_{Vt2}(v), \ldots, F_{Vtm}(v)$, where $F_x(x)$ is the probability that a random variable 'X' (in subscript) is less than 'x.' Therefore, $F_{Vt1}(v)$ is the probability that a random velocity $V_{t1}$ at time point $t_1$ is less than a velocity 'v.' The probability 'P' is a selectable threshold and can be defined or tuned depending on wind conditions that are intended to be interpreted. The velocity 'v' can also be selected depending on wind conditions to be interpreted.

Several types of wind conditions can be interpreted from the forecasted wind speeds and the controller 18 sends control commands 28 accordingly to adjust operating parameters of the wind turbine. For example, a wind speed threshold "$V_x$" can be selected such that wind speeds greater than or equal to $V_x$ cause over-speed trip or shutdown of the turbine. The probability distributions from the probability density functions can then be used to determine a particular time point at which or after which the probability of wind speeds can be greater than $V_x$. Specifically, a probability '$P_{Vx}$' can be selected or tuned such that any probability greater than probability '$P_{Vx}$' is indicative of causing over-speed trip or shutdown of the turbine. For example, if $F_{Vt3}(V_x) > P_{Vx}$, $F_{Vt4}(V_x) > P_{Vx}, \ldots, F_{Vt20}(V_x) > P_{Vx}$, then it can be interpreted that the velocity from time points $t_3$ to $t_{20}$ will cause over-speed trip or shutdown of the turbine.

Similarly, another wind speed threshold "$V_y$" can be selected such that the wind speeds greater than or equal to $V_y$ is too high to avoid over speed of the rotor. The controller 18 can send control commands 28 to gradually reduce power output of the wind turbine to shutdown the wind turbine. Alternatively a rate of change in wind speed, typically an increase in wind speed, can be defined at which a trip (e.g. over speed event) could occur.

A series of probability density functions, for example, $F_{Vt6}(v)$ to $F_{Vt26}(v)$, can be used to obtain information about wind condition in the time period from $t_6$ to $t_{26}$. For example, any indication of lull type wind conditions can be interpreted by determining probability of wind speeds that can occur in the time period from $t_6$ to $t_{26}$. The forecasted wind speeds can be used to determine wind conditions when switching between variable pitch mode and variable rotor speed mode is absolutely necessary to minimize the frequency of the switching.

In another embodiment, the forecaster 16 further forecasts loads on the wind turbine by calculating probability density functions of the loads at the series of time points in the future based on at least a portion of prior loads. Load sensors (not shown) on the wind turbine can be used to obtain load data. The concept of calculating probability density functions of the loads is the same as the calculations involved in calculating probability density functions of the wind speeds. For example, a load threshold "$L_x$" can be selected such that loads greater than or equal to $L_x$ require change in operating parameters of the turbine, such as shutdown of the turbine. The probability distributions from the probability density functions can then be used to determine a particular time point at which or after which the probability of loads can be greater than $L_x$. A probability '$P_{Lx}$' can be selected or tuned such that any probability greater than probability '$P_{Lx}$' requires shutdown of the turbine. The controller 18 determines operating parameters of the wind turbine for the forecasted wind speeds and/or the forecasted loads and sends control commands 28.

In another embodiment (not shown), regression techniques of past data of wind speeds or loads can be used with wind speed and/or load forecasting. Several regression analyses would be possible. For example, finding a correlation between rotor blade loads and rotor position, or between sunrise and change in wind speed. These techniques may be combined with the probability density functions discussed previously. The controller 18 sends control commands 28 based on the probability density functions and regression analyses.

Figure 4:
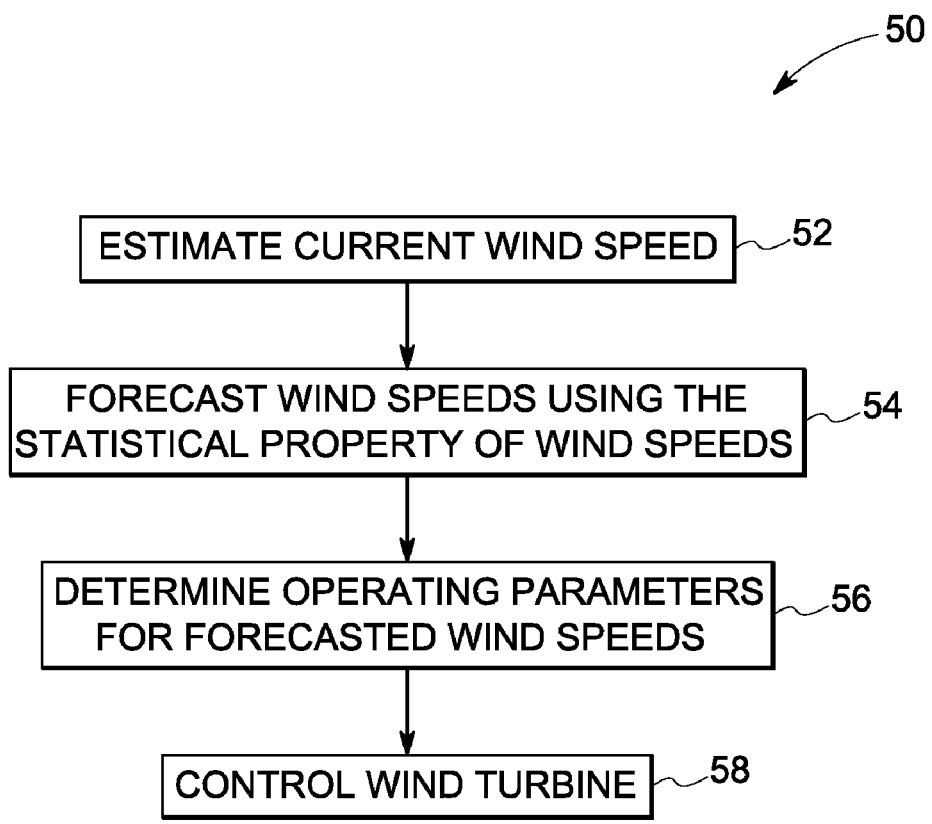
FIG. 4 illustrates a block diagram of an embodiment of the wind turbine operation method in accordance with aspects disclosed herein.

FIG. 4 illustrates a block diagram of a wind turbine operation method 50. The method 50 includes estimating current wind speed at block 52 using current operating parameters of a wind turbine, sensors such as anemometers, and aerodynamic characteristics of the wind turbine. Future wind speeds are then forecasted at block 54 using estimated current wind speed and past wind speeds. The forecasts include probability density functions of wind speeds at a series of time points in future. The measured or otherwise derived statistical property of wind speeds is used to create probability density functions of wind speeds. The operating parameters of a wind turbine are determined at block 56 for forecasted wind speeds. The wind turbine is then controlled using the determined operating parameters at block 58.

The wind turbine operating system and method thus provides a way to determine and adjust operating parameters of the wind turbine using forecasted wind speeds. The wind turbine operating system and method use the statistical property of wind speeds for wind speed forecasts and therefore do not require high cost sensor systems for measuring wind conditions ahead of the turbine. The wind speed forecasts are used as a feed-forward term into the wind turbine controller, enabling an increase in energy capture and a reduction in loads. Several types of hysteresis loops around shutdown-startup cycles and switching conditions can be avoided, limiting fatigue damage and improving energy capture.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for operating a wind turbine, comprising:
 a wind speed estimator for estimating current wind speed;
 a forecaster for forecasting wind speeds by creating probability density functions of wind speeds at a series of time points in the future based on the estimated current wind speed and past wind speeds; and
 a controller for determining operating parameters of the wind turbine for the forecasted wind speeds and providing control commands to the wind turbine based on the determined operating parameters.

2. The system of claim 1, wherein the control commands comprise commands to adjust current operating parameters of the wind turbine to the determined operating parameters.

3. The system of claim 2, wherein the current operating parameters of the wind turbine comprise turbine rotor speed, blade pitch angles, turbine output power, or combinations thereof.

4. The system of claim 2, wherein a control command to adjust current operating parameters of the wind turbine comprises gradually reducing power output of the wind turbine to mitigate effects of sudden shutdown of the wind turbine.

5. The system of claim 2, wherein the control commands are sent to actuators that adjust current operating parameters of the wind turbine.

6. The system of claim 1, wherein current wind speed is estimated using sensors on the wind turbine, current operating parameters of the wind turbine, aerodynamic characteristics of the wind turbine, or combinations thereof.

7. The system of claim 6, wherein the sensors comprise anemometers.

8. The system of claim 1, wherein the probability density functions of wind speeds are created using the statistical properties of wind speeds.

9. The system of claim 1, wherein the forecaster further forecasts loads on the wind turbine by calculating probability density functions of the loads at said series of time points in the future based on at least a portion of prior loads.

10. The system of claim 9, wherein the controller determines operating parameters of the wind turbine for the forecasted wind speeds and the forecasted loads.

11. A method of operating a wind turbine, comprising:
 obtaining the current wind speed;
 forecasting wind speeds by calculating probability density functions of wind speeds at a series of time points in the future based on the obtained current wind speed and past wind speeds;
 determining operating parameters of the wind turbine for the forecasted wind speeds; and
 controlling the wind turbine based on the determined operating parameters.

12. The method of claim 11, wherein controlling the wind turbine comprises adjusting current operating parameters of the wind turbine to the determined operating parameters.

13. The method of claim 12, wherein adjusting current operating parameters of the wind turbine comprises adjusting turbine rotor speed, blade pitch angles, turbine output power, or combinations thereof.

14. The method of claim 12, wherein adjusting current operating parameters of the wind turbine comprises gradually reducing power output of the wind turbine to mitigate effects of sudden shutdown of the wind turbine.

15. The method of claim 11, wherein obtaining current wind speed comprises estimating the current wind speed using sensors on the wind turbine, current operating parameters of the wind turbine, aerodynamic characteristics of the wind turbine, or combinations thereof.

16. The method of claim 15, wherein the current operating parameters comprise rotor speed, blade pitch angles, and power output of the wind turbine.

17. The method of claim 11, wherein the probability density functions of wind speeds are created using the statistical properties of wind speeds.

18. The method of claim 11, further comprising forecasting loads on the wind turbine by calculating probability density functions of the loads at said series of time points in the future based on at least a portion of prior loads.

19. The method of claim 18, wherein determining operating parameters of the wind turbine comprises determining operating parameters of the wind turbine for the forecasted wind speeds and the forecasted loads.

20. A method of operating a wind turbine, comprising:
estimating current wind speed using sensors on the wind turbine, current operating parameters of the wind turbine, aerodynamic characteristics of the wind turbine, or combinations thereof;
forecasting wind speeds by creating probability density functions of wind speeds at a series of time points in the future based on the estimated current wind speed and past wind speeds by using the statistical property of wind speeds;
determining operating parameters of the wind turbine for the forecasted wind speeds; and
controlling the wind turbine based on the determined operating parameters.

21. The method of claim 20, wherein controlling the wind turbine comprises adjusting current operating parameters of the wind turbine to the determined operating parameters.

22. The method of claim 21, wherein adjusting current operating parameters of the wind turbine comprises adjusting turbine rotor speed, blade pitch angles, turbine output power, or combinations thereof.

23. The method of claim 21, wherein adjusting current operating parameters of the wind turbine comprises gradually reducing power output of the wind turbine to mitigate effects of sudden shutdown of the wind turbine.

24. The method of claim 20, wherein the current operating parameters comprise rotor speed, blade pitch angles, and power output of the wind turbine.

25. The method of claim 20, further comprising: forecasting loads on the wind turbine by calculating probability density functions of the loads at said series of time points in the future based on at least a portion of prior loads and determining operating parameters of the wind turbine for the forecasted loads in addition to the forecasted wind speeds.

* * * * *